United States Patent [19]

Matsuo et al.

[11] 4,450,004

[45] May 22, 1984

[54] DEPHOSPHORIZATION AND DESULFURIZATION METHOD FOR MOLTEN IRON ALLOY CONTAINING CHROMIUM

[75] Inventors: Tohru Matsuo, Hyogo; Takeo Aoki, Kawanishi, both of Japan

[73] Assignee: Sumitomo Kinzoku Kogyo Kabushiki Kaisha, Osaka, Japan

[21] Appl. No.: 471,238

[22] Filed: Mar. 2, 1983

[30] Foreign Application Priority Data

Mar. 3, 1982 [JP] Japan .................................. 57-33549

[51] Int. Cl.$^3$ .............................................. C21C 7/02
[52] U.S. Cl. ........................................ 75/53; 75/58; 75/257
[58] Field of Search .............................. 75/53, 58, 257

[56] References Cited

U.S. PATENT DOCUMENTS 4,014,685  3/1977  Jones ......................................... 75/58
4,097,269  6/1978  Holzgruber ............................. 75/53

*Primary Examiner*—Peter D. Rosenberg
*Attorney, Agent, or Firm*—Burns, Doane, Swecker & Mathis

[57] ABSTRACT

A method of dephosphorization and desulfurization for molten iron alloy containing chromium, which adds to the bath of molten iron alloy flux comprising alkaline-earth metal oxide and alkaline-earth halide and further adds to the same the predetermined quantity of oxidizing agent, so that simple, highly efficient and economical dephosphorization and desulfurization are performable to produce high-chromium steel or stainless steel of high quality, iron oxide, chromium oxide or oxidizing gas are used as the oxidizing agent.

10 Claims, No Drawings

1

DEPHOSPHORIZATION AND DESULFURIZATION METHOD FOR MOLTEN IRON ALLOY CONTAINING CHROMIUM

BACKGROUND OF THE INVENTION (1) Field of the Invention

This invention relates to dephosphorization and desulfurization methods for a molten iron alloy containing chromium.

(2) Description of the Prior Art

Generally, phosphorus (P) contained in high-chromium steel or stainless steel is well-known as the harmful impurity having an adverse effect on the mechanical property and causing stress-corrosion cracking of steel. However, the dephosphorization for such molten iron alloy containing chromium, even when applied with a usual method for an iron alloy: dephosphorization method of high oxygen potential using CaO—FeO flux or that by oxygen blowing with burned lime (calcium oxide) has been considered to be very difficult because chromium is merely preferentially oxidized in a large quantity and slag is solidified to make hard the progress of oxidization of P.

Conventionally, as the dephosphorization methods for the molten iron alloy containing chromium, the following two methods have been adopted:

① Dephosphorization by using the Ca—$CaF_2$ flux in the electro slag and remelting process, and ② Dephosphorization by using $CaC_2$—$CaF_2$ flux in the ladle.

Both the methods perform the dephosphorization by Ca, in which the dephosphorization proceeds in reducing condition which is given by $$3(Ca) + 2P \rightarrow (Ca_3P_2),$$

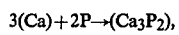

and the latter dephosphorization utilizes Ca produced by the decomposition reaction of $CaC_2$ given by $$CaC_2 \rightarrow Ca + 2C.$$

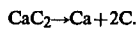

By either method, however, $Ca_3P_2$ is contained in the slag after the dephosphorization treatment. The $Ca_3P_2$, as in slag reacts with $H_2O$ in air forming phosphine ($PH_3$), which is given by $$Ca_3P_2 + 3H_2O \rightarrow 3CaO + 2PH_3,$$

the phosphine is poisonous and having a bad smell of garlic, thereby the problem of the treatment of slag after dephosphorization has been considered to be difficult to solve.

OBJECT OF THE INVENTION

An object of the invention is to provide a dephosphorization and desulfurization method for a molten iron alloy containing chromium, which can avoid generating of poisonous and ill-odored slag.

Another object of the invention is to provide a dephosphorization and desulfurization method simple, highly efficient and economical.

Still another object of the invention is to provide a method for manufacturing high-chromium steel and stainless steel of high quality.

The above and further objects and novel features of the invention will more fully be apparent from the following detailed description.

DETAILED DESCRIPTION OF THE INVENTION

In the light of the above problem, the inventors have made various researches on new simple dephosphorization methods without generating the poisonous slag troublesome in the treatment, prior to decarbonization of molten iron alloy containing chromium, by oxygen blowing in AOD, VOD, converter process, or a vacuum furnace such as RH or the like in the refining of high-chromium steel or stainless steel of low phosphorus. As a result, they have discovered that the molten iron alloy containing chromium of 3 to 30% (hereinafter % represents weight percentage) is added with flux comprising alkaline-earth metal oxide, such as CaO or BaO, for the stabilizer of $P_2O_5$ oxidized by an oxidizing agent, and alkaline-earth metal halide, such as $CaCl_2$, $BaCl_2$ or $BaF_2$, as a agent to get fluid slag and further with an oxidizing agent of a certain limited quantity, whereby phosphorus contained in the iron alloy containing chromium is effectively removed and simultaneously the slag highly basic and of relatively low oxygen potential also allows the desulfurization to proceed.

This invention has been designed on a basis of the above knowledge. This invention is characterized by including a process of adding to the bath of molten iron alloy flux comprising one or two kinds or more of alkaline-earth metal oxides and one or two kinds or more of alkaline-earth metal halides and that of adding to the same an oxidizing agent in an amount with which the generated slag is not solidifed, thereby making it possible to remove the components of phosphorus and sulfur from the iron alloy or nickel alloy, containing chromium, without any troublesome operation. In addition, the above "solidification of slag" means that the slag loses its fluidity not to allow the dephosphorization and desulfurization reaction to physically proceed.

Also, it is preferable to use as the above oxidizing agent one or two kinds or more of iron oxide, chromium oxide, and chromium ore because they have no bad influence on the component composition of iron alloy to be produced. From this viewpoint, gas containing one or two kinds or more of oxidizing gases, such as oxygen or air, is useful to be adopted and these oxides and oxidizing gas of course may be used in combination. Alternatively, any oxidizing agent having no bad influence on the composition of iron alloy of course may be used.

The method of the invention, even when the carbon content in the molten iron is about 6% in saturation, or 1% or less, has been assured of an effective progress of dephosphorization and desulfurization.

Next, the function of oxidizing agent and flux components used in the method of the invention will further be detailed.

The proceeding of dephosphorization under the oxidation reaction needs an oxidizing agent for oxidizing phosphorus in the molten iron alloy to form, for example, $P_2O_5$ and basic oxide for stabilizing the $P_2O_5$ of acidic oxide.

Any oxidizing agent is usable which can supply oxygen as aforesaid and is reducible in itself to be the reduced product, such as Cr, Ni or Fe, so as not to be harmful to the product of high-chromium steel or stainless steel. Any oxidizing agent, however, when in use, is very important to limit its quantity of addition to a certain value.

In other words, the added oxygen oxidizes chromium preferentially rather than phosphorus in the molten iron and then iron and carbon in part, the chromium oxide have a relatively high melting point (e.g. a degree of 1990° C. in $Cr_2O_3$). Hence, in a case where the produced chromium oxide exceeds an amount to be dissolved in the slag produced with the added alkaline-earth metal oxide and alkaline-earth metal halide, the more the amount increases, the more the slag solidifies, thereby not allowing the dephosphorization reaction to physically proceed. From this, it is important to control the amount of chromium oxide in the slag under its solubility, but the amount of chromium oxide, even when somewhat exceeding the range of solubility, may not be critical unless the amount leads to the solidification of slag and prevention of the dephosphorization reaction.

On the other hand, the chromium oxide in the slag, during the treatment, is consumed up by oxidation of P and decarbonization albeit at a slow rate. The dephosphorization reaction in the method of the invention is better to have a large oxidizing force for the slag, from which the more chromium oxide is preferable.

From the above viewpoint, it is important for the method of the invention to properly add the above oxidizing agent so that chromium oxide produced in the molten iron, or chromium oxide added as the oxidizing agent, increases as much as possible within the range where the slag is not solidified.

In addition, the solubility of chromium oxide in the slag is different depending on the composition of slag in use and the treatment temperature, for example, the solubility in the flux whose composition is the (30 to 50%) BaO and (70 to 50%) $BaCl_2$ at the treatment temperature of 1450° to 1500° C. is about 6 to 8%.

Thus, it is important to control the amount of chromium oxide in the slag less than that of not solidifying the slag. For the purpose of this, when the oxide, such as iron oxide, chromium oxide or chromium ore, is used, it is desirable to adopt continuous adding or separate throw-in. Also, when oxidizing gas, such as oxygen gas or air, is used, care is to be fully taken to the blowing quantity of the gas.

The oxidizing gas may be added by being blown into the molten iron by use of an top blowing lance or a nozzle installed at the bottom or the side wall thereof as the AOD method. In this case, a mixture of oxidizing gas with Ar or the like need only be blown into the molten iron.

If the above treatment is performed in the air, oxygen therein acts effectively as the oxidizing agent, so that the entering air only, even without positive addition of oxidizing agent, allows the dephosphorization to proceed.

Now, the alkaline-earth metal oxide may be MgO, SrO or BaO other than the most usual CaO in the steel making, among which MgO is less in the stability for $P_2O_5$ and SrO is expensive, whereby CaO and BaO are the most suitable.

Also, since the alkaline-earth metal oxide has a high melting point, its effective contribution to the reaction needs the use of an agent to get fluid slag to melt the oxide without lowering activity of the basic oxide.

For such agent to get fluid slag, the alkaline-earth metal halide in a homologous series to the basic oxide is suitable, among which chlorides or fluorides, such as $CaCl_2$, $CaF_2$, $BaCl_2$ and $BaF_2$, are usual and the most suitable. The agent to get fluid slag, for example when BaO is selected as the oxide, is preferable to be the similar alkaline-earth metal compound, such as $BaCl_2$ or $BaF_2$, but not limited thereto, so that one or two or more compounds may be used together.

Now, the alkaline-earth metal oxide of course can use these industrial products directly. Alternatively, a carbonate or a hydroxide of alkaline-earth metal, such as $BaCO_3$ or $Ba(OH)_2$, is usable as a substituted for the above, because it, when added to the objective molten iron alloy, decomposes as $BaCO_3 \rightarrow BaO + CO_2$ and $Ba(OH)_2 \rightarrow BaO + H_2O$, so as to be the alkaline-earth metal oxide. In this case, since the decomposed $CO_2$ or $H_2O$ itself is oxidizing gas, there is no need of especially adding the oxidizing agent when using such carbonate or hydroxide.

A blending ratio of alkaline-earth metal oxide to alkaline-earth metal halide added as the flux depends upon the kind of flux in use, in which the oxide of about 20 to 60% is preferable, because when the alkaline-earth metal oxide decreases in the ratio, the slag is kept in the melting state, but lowers in the stabilization of $P_2O_5$ to deteriorate the dephosphorizing power. On the other hand, when the ratio of alkaline-earth metal oxide exceeds 60%, the slag is hard to keep its melting condition, thereby also deteriorating the dephosphorizing power. Hence, it is preferable to keep the ratio of alkaline-earth metal oxide in 30 to 50%.

The flux, when containing therein impurites, such as $SiO_2$ or $Al_2O_3$, of acidic oxide, will lower the basicity of slag and is not preferable due to difficult stabilization of $P_2O_5$. Hence, the impurities are desired to be as little as possible and, even in a large quantity, preferred to be under 20% of the gross of flux.

Also, in a case where the objective molten iron alloy contains therein a alloying element, such as silicon or the like, having a stronger affinity for oxygen than that of chromium, in a large quantity the silicon consumes oxygen of oxidizing agent throughly and the produced $SiO_2$ of acidic oxide is not preferable, whereby such element is better to be as little as possible. For example, the quantity of Si, which differs due to the quantity of addition of flux, is required to be under 0.3% at most and desirable to be under 0.1% if it is possible. Hence, in a case where Si in quantity more than the above is contained in the molten iron alloy, a flux mainly comprising iron oxide or oxygen gas, and CaO, or the flux used in this invention, is used, and the preliminary desiliconization is performed and after removal of the slag and then the method of this invention is applied is the required process.

On the other hand, an element such as Ni, having a lower affinity for oxygen than that of Cr, even when contained in the molten iron alloy, is not at all problematical, and the dephosphorization is not at all hindered even when Ni corresponding to SUS 304 or an alloy of Ni base is contained.

In order to increase the ratio of dephosphorization reaction, it is important to agitate the molten iron and slag to well contact with each other after addition of flux and oxidizing agent.

The agitation may use the conventional impellers, or the bubbling by Ar or $N_2$, or any other method if agitation is possible.

Next, the method of the invention will be described in accordance with the following embodiments.

EXAMPLE 1

2 kg of iron alloy containing chromium with the composition shown in Table 1, was molten in the air and within a MgO crucible by use of the Tammann furnace, kept at a temperature of 1450° C., and added with 200 g of flux comprising 40% BaO and 60% $BaF_2$, and then 10 g of $Cr_2O_3$ as the oxidizing agent was separately thrown in little by little while agitating the alloy by graphite-natured impellers.

The composition of iron alloy after the dephosphorization treatment for fifteen minutes was shown in Table 1.

Thus, the slag was treatable in condition of not solidifying and as seen from the result in Table 1, the method of the invention could attain the dephosphorization of 61% simultaneously with the desulfurization of 70%.

TABLE 1

| Chemical Component (wt. %) | C | Si | Mn | P | S | Cr | Ni | Fe |
| --- | --- | --- | --- | --- | --- | --- | --- | --- |
| Before Treatment | 1.42 | 0.03 | 0.06 | 0.028 | 0.010 | 16.9 | 9.1 | the Rest |
| After Treatment | 1.40 | trace | 0.06 | 0.011 | 0.003 | 16.7 | 9.1 | the Rest |

EXAMPLE 2

2 kg of iron alloy containing chromium with the composition shown in Table 2 was molten in the air and within the MgO crucible by use of Tammann furnace, kept at a temperature of 1500° C., and thereafter added with 200 g of flux previously molten within a platinum crucible comprising 40% BaO and 60% $BaCl_2$ and agitated by MgO impellers, at which time no oxidizing agent was positively used.

After the above treatment for forty minutes the composition also was shown in Table 2.

Thus, even when no oxidizing agent was not positively used, oxygen in the air allowed the dephosphorization of 69% and desulfurization of 86% to proceed without a substantially accompanied chromium loss. In addition, the slag kept in melting condition during above treatment.

TABLE 2

| Chemical Component (wt. %) | C | Si | Mn | P | S | Cr | Fe |
| --- | --- | --- | --- | --- | --- | --- | --- |
| Before Treatment | 0.98 | 0.03 | 0.07 | 0.032 | 0.022 | 16.9 | the Rest |
| After Treatment | 0.93 | trace | 0.07 | 0.010 | 0.003 | 16.4 | the Rest |

EXAMPLE 3

2 kg of molten iron alloy containing chromium with the composition of carbon in saturation as shown in Table 3 was molten in the air and within a graphite crucible by use of the Tammann furnace, kept in a temperature of 1350° C., and thereafter added with 200 g of mixed flux comprising 30% CaO and 70% $CaCl_2$, and chromium ore of 15 g was separately thrown in little by little for fifteen minutes while agitating the alloy by graphite-natured impellers.

The components of molten iron also were shown in Table 3.

Thus, the slag was treatable while being kept in melting condition, and as seen from Table 3 the dephosphorization of 65% proceeded simultaneously with the desulfurization of 90%.

TABLE 3

| Chemical Component (wt. %) | C | Si | Mn | P | S | Cr | Fe |
| --- | --- | --- | --- | --- | --- | --- | --- |
| Before Treatment | 6.2 | 0.05 | 0.05 | 0.052 | 0.031 | 18.2 | the Rest |
| After Treatment | 6.2 | trace | 0.05 | 0.018 | 0.003 | 18.0 | the Rest |

EXAMPLE 4

2 kg of iron alloy containing chromium with the composition of carbon in saturation as shown in Table 4 was molten in the air and within a graphite crucible by use of the Tammann furnace, kept in a temperature of 1340° C., and thereafter added by 200 g of a mixed flux comprising 30% BaO and 70% $CaCl_2$ so that $Fe_2O_3$ of 15 g was separately thrown in little by little for fifteen minutes while agitating the molten iron by graphite-natured impellers.

The components of iron alloy after the treatment were shown in Table 4.

TABLE 4

| Chemical Component (wt. %) | C | Si | Mn | P | S | Cr | Fe |
| --- | --- | --- | --- | --- | --- | --- | --- |
| Before Treatment | 6.2 | 0.01 | 0.03 | 0.052 | 0.032 | 17.2 | the Rest |
| After Treatment | 6.3 | trace | 0.03 | 0.026 | 0.004 | 16.5 | the Rest |

Thus, the slag was kept in the melting condition during the treatment so that the dephosphorization of 50% and desulfurization of 88% proceeded without a substantially accompanied chromium loss.

EXAMPLE 5

2 kg of iron alloy containing chromium with the composition shown in Table 5 was molten in the air and within a MgO crucible by use of the Tammann furnace, kept in a temperature of 1460° C., and thereafter added with 200 g of a mixed flux comprising 40% BaO and 60% $BaCl_2$, so that $O_2$ gas of 0.1 l/min was blown into the molten iron by use of a MgO pipe for twenty-five minutes while agitating the molten iron by use of another MgO pipe.

TABLE 5

| Chemical Component (wt. %) | C | Si | Mn | P | S | Cr | Fe |
| --- | --- | --- | --- | --- | --- | --- | --- |
| Before Treatment | 1.52 | 0.02 | 0.04 | 0.038 | 0.015 | 16.7 | the Rest |
| After Treatment | 1.44 | trace | 0.04 | 0.014 | 0.002 | 16.2 | the Rest |

The components of molten iron after the treatment also were shown in Table 5.

Thus, the slag was treatable while being kept in melting condition, so that the dephosphorization of 63% proceeded simultaneously with the desulfurization of 87% without a substantially accompanied chromium loss.

As this invention may be embodied in several forms without departing from the spirit of essential characteristics thereof, the present embodiment is therefore illus-

What is claimed is:

1. A method of dephosphorizing and desulfurizing a molten iron alloy containing chromium, comprising adding to the molten iron alloy (a) a flux comprised of at least one alkaline-earth metal oxide and at least one alkaline-earth metal halide and (b) an oxidizing agent in an amount sufficient to achieve dephosphorization and to prevent solidification of generated slag.

2. The method of dephosphorizing and desulfurizing a molten iron alloy containing chromium as set forth in claim 1, wherein the oxidizing agent is at least one of the group consisting of iron oxide, chromium oxide and chromium ore.

3. The method of dephosphorizing and desulfurizing a molten iron alloy containing chromium as set forth in claim 1, wherein oxidizing gas is used as said oxidizing agent.

4. A method of dephosphorizing and desulfurizing a molten iron alloy containing chromium as set forth in claim 1, wherein said oxidizing agent is at least one of the group consisting of iron oxide, chromium oxide and chromium ore in combination with an oxidizing gas.

5. The method of dephosphorizing and desulfurizing a molten iron alloy containing chromium as set forth in claim 1, wherein the molten iron alloy contains 3 to 30% by weight of chromium.

6. The method of dephosphorizing and desulfurizing a molten iron alloy containing chromium as set forth in claim 1, wherein the flux is comprised of about 20 to 60% by weight of the alkaline earth metal oxide and about 40 to 80% by weight of the alkaline earth metal halide.

7. The method of dephosphorizing and desulfurizing a molten iron alloy containing chromium as set forth in claim 1, wherein the flux is comprised of about 30 to 50% by weight of the alkaline earth metal oxide and about 50 to 70% by weight of the alkaline earth metal halide.

8. The method of dephosphorizing and desulfurizing a molten iron alloy containing chromium as set forth in claim 1, wherein the amount of silicon in the molten iron alloy is less than 0.3% by weight.

9. The method of dephosphorizing and desulfurizing a molten iron alloy containing chromium as set forth in claim 1, wherein the amount of silicon in the molten iron alloy is less than 0.1% by weight.

10. The method of dephosphorizing and desulfurizing a molten iron alloy containing chromium as set forth in claim 1, wherein the molten iron alloy is agitated while the flux is being added.

* * * * *